(12) United States Patent
Montano et al.

(10) Patent No.: US 7,072,728 B2
(45) Date of Patent: Jul. 4, 2006

(54) METHOD FOR ASSEMBLING HARDWARE COMPONENTS IN A COMPUTER SYSTEM

(75) Inventors: Brian Greg Montano, Austin, TX (US); James Richard Wadley, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 143 days.

(21) Appl. No.: 10/644,428

(22) Filed: Aug. 20, 2003

(65) Prior Publication Data

US 2004/0039561 A1 Feb. 26, 2004

Related U.S. Application Data

(63) Continuation of application No. 09/443,806, filed on Nov. 19, 1999, now abandoned.

(51) Int. Cl.
G06F 19/00 (2006.01)
G06F 9/44 (2006.01)

(52) U.S. Cl. ............... 700/97; 700/95; 703/21; 705/27

(58) Field of Classification Search ........... 700/95–97, 700/103, 104, 106, 107; 703/21; 716/9; 705/27

See application file for complete search history.

(56) References Cited

U.S. PATENT DOCUMENTS

| | | | |
|---|---|---|---|
| 4,870,591 A * | 9/1989 | Cicciarelli et al. .......... 700/107 |
| 5,465,216 A * | 11/1995 | Rotem et al. ................... 716/5 |
| 5,515,524 A | 5/1996 | Lynch et al. ................... 703/13 |
| 5,577,213 A | 11/1996 | Avery et al. ................. 710/100 |
| 5,579,509 A | 11/1996 | Furtney et al. ............... 703/27 |
| 5,596,723 A | 1/1997 | Romohr ..................... 709/222 |
| 5,675,748 A | 10/1997 | Ross .......................... 710/104 |
| 5,696,968 A | 12/1997 | Merkin .......................... 713/2 |
| 5,708,798 A | 1/1998 | Lynch et al. ................... 703/1 |
| 5,751,575 A | 5/1998 | Hirosawa et al. ............. 700/83 |
| 5,887,165 A | 3/1999 | Martel et al. ............... 713/100 |
| 5,894,571 A | 4/1999 | O'Connor ...................... 713/2 |
| 5,961,557 A * | 10/1999 | Morimoto et al. ............. 701/1 |
| 5,983,353 A | 11/1999 | McHann, Jr. ............... 713/310 |
| 5,991,806 A | 11/1999 | McHann, Jr. ............... 709/224 |
| 6,038,399 A * | 3/2000 | Fisher et al. ................. 717/178 |
| 6,052,727 A | 4/2000 | Kamalanathan ............. 709/224 |
| 6,080,207 A * | 6/2000 | Kroening et al. ........... 717/172 |
| 6,134,614 A * | 10/2000 | Chari et al. ................. 710/302 |

(Continued)

OTHER PUBLICATIONS

Lee et al., "Integrated Configuration Management system (ICMS) for Computer System Development", PRIME '97, Innovation in Technology Management—The Key to Global Leadership, Jul., 1997, pp. 472-475.

*Primary Examiner*—Paul Rodriguez
(74) *Attorney, Agent, or Firm*—Baker Botts L.L.P.

(57) ABSTRACT

A method for manufacturing a computer system (100) is disclosed in which the selection of hardware components in the computer system is evaluated to determine the compatibility of the hardware components of the computer system. Compatibility among hardware components is evaluated as well as compatibility between the hardware components and the base architecture of the computer system. As part of the evaluation of the selection of the hardware components of the computer system, the installation location of each hardware component is determined and a graphical representation (402) of the hardware components and their installation locations is created as an aid to the assembly of the computer system.

9 Claims, 2 Drawing Sheets

U.S. PATENT DOCUMENTS

| | | | | |
|---|---|---|---|---|
| 6,167,383 A | * | 12/2000 | Henson | 705/26 |
| 6,240,328 B1 | * | 5/2001 | LaLonde et al. | 700/95 |
| 6,446,243 B1 | * | 9/2002 | Huang et al. | 716/7 |
| 6,711,645 B1 | * | 3/2004 | Chari et al. | 710/302 |
| 6,735,757 B1 | * | 5/2004 | Kroening et al. | 717/120 |
| 6,898,580 B1 | * | 5/2005 | Curran et al. | 705/400 |

* cited by examiner

METHOD FOR ASSEMBLING HARDWARE COMPONENTS IN A COMPUTER SYSTEM

CROSS-REFERENCE TO RELATED APPLICATION

This patent application is a continuation of application Ser. No. 09/443,806, filed Nov. 19, 1999 now abandoned, which is incorporated herein by reference.

TECHNICAL FIELD OF THE INVENTION

The invention relates generally to the manufacture or assembly of computer systems and, more particularly, to a method for determining a suitable location for the installation of hardware components of a computer system during the manufacture and assembly of the computer system.

BACKGROUND OF THE INVENTION

During the manufacture of a computer system, the computer system may be configured to fit the needs of the customer or user of the computer system. Customization of a computer system often occurs through the addition of hardware or software components selected by the user to be added to the computer system. One computer system manufacturing model that permits customization is the build-to-order manufacturing model, in which the user is permitted to specify the details of the computer system to be manufactured, and the computer system is manufactured following receipt of the customer's order. In a build-to-order manufacturing process, the customer is able to select the hardware and software components that are to be included in the customer's computer system. The hardware components that may be selected by the customer for installation in the computer system include, for example, expansion cards, controllers, modems, network cards, and memory cards, among other available hardware components.

Because of the number of hardware components that are available for installation in a computer system during the manufacture of the computer system, the integration of the selected components in the computer system is critical to the manufacturing process. The integration of the hardware components comprises at least two goals. First, the selected hardware components must each function as intended when installed in the computer system, and, second, the selected hardware component must function with other components. Incompatibility or inoperability problems may occur if hardware components selected by the customer are improperly installed or conflict with one another following installation. Because of the possibility that some hardware components will not function when installed with other hardware components and because of the possibility that some hardware components will only work when installed in certain locations in the computer system, the manufacturers of computer systems and hardware components have developed an extensive and complex set of rules for the configuration of the numerous hardware components available for installation in a computer system.

In view of the variety of hardware components available for installation in a computer system, computer systems are becoming more difficult to manufacture in a build-to-order environment. Along with each hardware component that is available for installation in a computer system comes a complex set of rules regarding the installation of the component. Assigning a set of installation rules to each hardware component available for installation has become known as the rules-based approach to the configuration of computer systems. Despite knowledge of the configuration rules associated with each component slated to be installed in a computer system, it has proved difficult for computer system manufacturers to follow a set of complex configuration rules for the placement or installation of each of these numerous components available for installation. Configuration rules for installing a certain hardware component may directly conflict with configuration rules for installing one or more other hardware components. The configuration rules themselves may be unyielding. The improper placement or installation of a hardware component can cause a computer system to function improperly or operate at less than its optimum performance. Conflicts often occur because two or more hardware components are competing for the same resources in the computer system.

The rules for installing a certain hardware component may also vary from computer system to computer system. As such, the rules for installing a particular component may be different depending on the characteristics of the computer system being manufactured. Computer manufacturers have therefore had to learn all the variations of the configuration rules for each computer system being manufactured. Moreover, the configuration rules may differ for a given hardware component depending on the identity of any additional components that are slated to be installed in the computer system.

In addition to learning the various configuration rules, in many instances, computer system manufacturers have also had to learn exceptions to the rules. Exceptions to the configuration rules for a given hardware component may exist because of discovered incompatibilities between certain hardware components and certain computer systems. Other exceptions may arise because of discovered bugs or defects in the hardware component or computer system. These exceptions are often discovered by computer manufacturers through trial and error.

The configuration rules and their exceptions are not static, however. The universe of rules and instructions for a computer system is always changing. With each new hardware component that is introduced into the sales market by a hardware component manufacturer, configurations rules and exceptions are also introduced. The rules and exceptions for a given hardware component are often updated to ensure the proper configuration and operation of the hardware component and the computer systems containing the hardware component. Because of the frequency of rule changes, maintaining a current set of the configuration rules and exceptions is difficult.

Many of the hardware components to be installed within a computer system come with configuration rules in the form of electronic work instructions (EWIs). The EWIs detail how the hardware component should be configured. However, it is often difficult for computer builders to follow the complex set rules contained in EWIs because the EWIs often describe configuration in generic terms and are not tailored to the computer system being manufactured. As such, valuable time is being wasted by manufacturers on troubleshooting while computer system manufacturers attempt to install and configure computer system components on the basis of generic EWIs and trial and error. This process is problematic in a build-to-order environment, where computer manufacturers often manufacture a computer system that includes a configuration of components that has not been extensively tested by the computer manufacturer. In such an environment, generic EWIs are not sufficient, and the trial and error method wastes time, money, and resources.

Instead of a rules based approach for configuring hardware components during the manufacture of computer systems, some computer system manufacturers configure hardware components according to a constraint-based approach. In such a constraint-based configuration system, the manufacturer employs dependent variables that are linked to or associated with certain hardware components. For example, if the manufactured computer system is to have component Y, then component X must also be installed in the computer system. Thus, the requirement that the computer system use component X is a constraint on the use of component Y. The constraint-based approach is problematic in that some computer systems will not allow the computer manufacturer to manufacture a computer system that corresponds to the configuration mandated by the constraints. Further, the constraint-based approach does little to instruct the user as to the proper installation location for the selected hardware components. Instead, the constraints simply identify the collection of components that are required to be installed to accommodate other components.

Other computer system manufacturers have employed a functional approach to the configuration of hardware components in a computer system. According to the functional approach, the configuration of hardware components in the computer system is determined by the purpose or function to be performed by the hardware components. The functional approach, however, does not determine the physical location for the installation of the devices. Rather, the functional approach only defines the functions of the various hardware components.

Computer manufacturers have also attempted to combine the constraint-based and functional approaches to define a hardware configuration that is logical and generates a hardware relationship between hardware components and their physical location. The combination of the constraint-based approach and functional approach attempts to define a hardware configuration by defining the functions of the components and the constraints on the identity of components in the computer system. This approach, however, is problematic in that it does not identify a suitable location for the placement of each hardware component within the computer system.

Other computer manufacturers that have attempted a trial and error approach to hardware configuration have focused their analysis on such variables as the frequency of interrupt requests, direct memory address accesses, and BIOS calls. The trial and error techniques often involve an analysis of the BIOS manufacture and revision for each affected computer system. However, the trial and error techniques have often not included consideration of the firmware revision of selected hardware components of the computer system and the manner in which the firmware revisions affect the compatibility of hardware components within the computer system.

SUMMARY OF THE INVENTION

In accordance with teachings of the present invention, a system and method for manufacturing a computer system is disclosed that provides significant advantages over prior manufacturing techniques. The disclosed embodiments permit the manufacture of a computer system in a manner that insures the compatibility of the hardware components of the computer system.

According to the manufacturing process, a customer order is received and an architecture resource file is created. The architecture resource file identifies the base architecture of the computer system and the hardware components of the computer system, including the custom hardware components selected by the user for installation in the computer system. A hardware verification program is executed. The hardware verification program evaluates the compatibility of the hardware components. In evaluating the compatibility of each hardware component, the hardware verification program selects an installation location in the computer system for the hardware component. The hardware verification program selects successive hardware components and associated installation locations, determining after each selection whether the hardware component is compatible. Compatibility is judged by evaluating compatibility between each hardware component and the base architecture of the computer system and between each hardware component and all other hardware components to be installed in the computer system. Once each hardware component has been determined to be compatible and an installation location has been identified for each component, the hardware verification program transmits to a set of installation instructions and a graphical representation of the installation location of each hardware component in the computer system.

One technical advantage of the manufacturing process described is the ability to evaluate the compatibility of computers system in a build-to-order manufacturing environment, where a multitude of possible computer system configurations are available for order by the customer. The manufacturing process described can determine the compatibility of a set of hardware components. In this manner, it is not necessary to pre-test each possible hardware configuration that could result from a customer order placed in a build-to-order manufacturing environment. Rather, the compatibility of the set of hardware components selected for installation in the computer system is determined after the order is received.

Another technical advantage of the present invention is an evaluation process that produces for the computer manufacturer a graphical representation of the installation locations of the hardware components in the computer system. In this manner, manufacturing personnel on the manufacturing floor receive, along with the kit of computer system parts to be installed, a graphical diagram of the installation sites of each hardware component in the system. The use of a graphical representation also permits the computer manufacturer to verify that the hardware components of the customer order correspond to the hardware components of the graphical representation, and that each in turn corresponds to the hardware components included for manufacture in the computer system.

Other technical advantages will be apparent to those of ordinary skill in the art in view of the following specification, claims, and drawings.

DETAILED DESCRIPTION OF THE INVENTION

Figure 1:
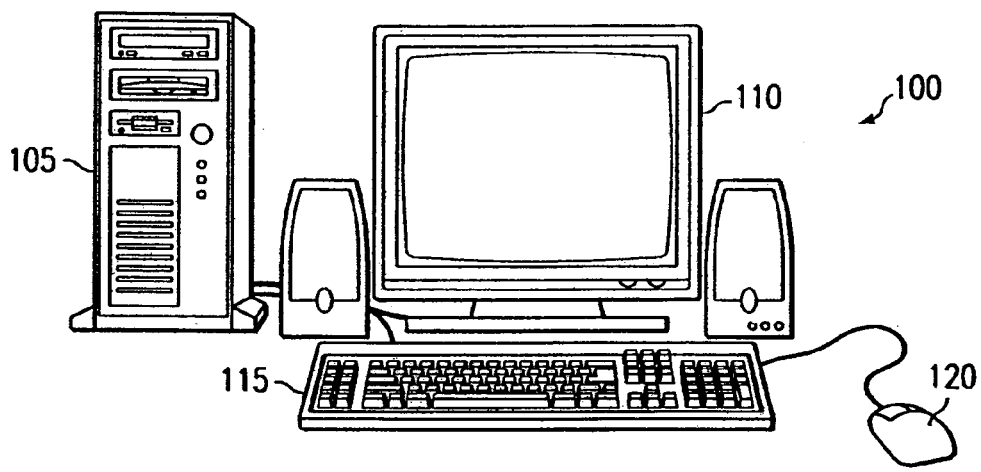
FIG. 1 is a pictorial view of a computer system.

The computer system 100 of FIG. 1 includes a case 105, a graphical display unit or monitor 110, a keyboard 115, and a mouse 120. The case 105 houses much of the hardware of the computer system. Housed within case 105 is the motherboard of the computer system and all the components that reside on the motherboard, including the microprocessor, related chip sets, memory, cards, and all other hardware components that are coupled to the motherboard.

Figure 2:
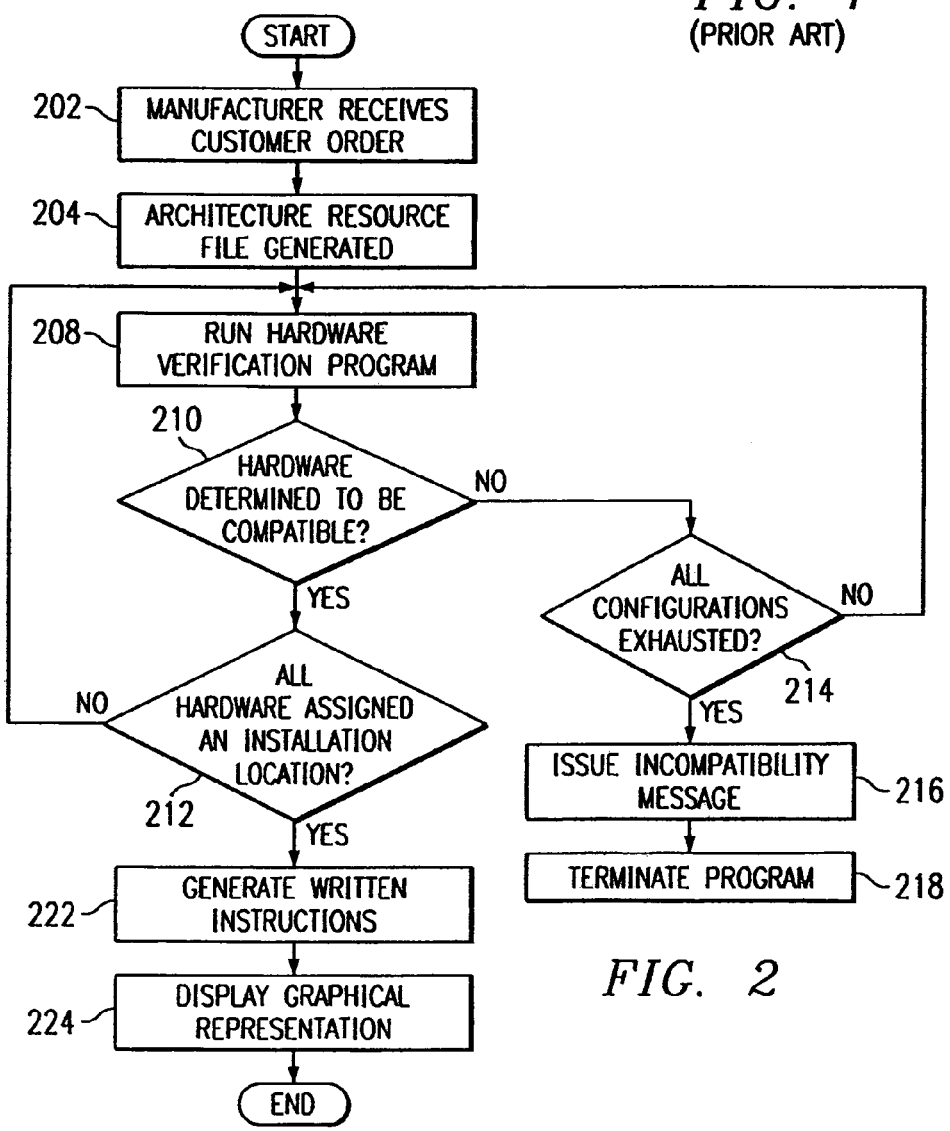
FIG. 2 is a flow diagram of a method for evaluating a proposed hardware configuration.

Shown in FIG. 2 is a flow diagram of the manufacturing process described herein. At step 202, the computer manufacturer receives an order from a customer for a computer system. In the order, the customer specifies the particular hardware and software requirements of the computer system. A computer manufacturing system of this type is known as a build-to-order manufacturing system. In a build-to-order manufacturing environment, the customer is permitted to specify the precise hardware and software requirements of the system, and the system is manufactured following the customer's order to the customer's specifications. In terms of software requirements, the customer may specify the operating system and the software applications to be installed in the computer system. In terms of hardware requirements, the customer may specify the base architecture of the computer system, including the processor type, chip set and bus architecture, and motherboard. The customer may also specify numerous other hardware variables for the computer system, including the size of the hard drive, the amount of installed memory, and the amount of cache memory. The customer may also order other hardware components for installation in the computer system, including the installation of certain modem hardware, graphics cards, network interface cards, or expansion cards. The customer may also specify the type of input and output devices to be included in the computer system, including an identification of the CD-ROM drive, DVD player, mouse, keyboard, and monitor to be included in the computer system.

Following the receipt of the order from the computer manufacturer, the computer manufacturer builds an architecture resource file at step 204 from the customer order. The architecture resource file identifies the computer architecture of the computer system that was ordered by the customer, including an identification of the base architecture and other hardware components and feature selected by the customer. Each of the custom hardware and software components that are to be installed in the computer system is identified in the architecture resource file. The custom hardware components ordered by the customer may include some combination of expansion cards, memory cards, controller cards, graphics cards, network interface cards, and other customizable hardware components. The architecture resource file will also identify the serial number of the computer system to be manufactured and the part number for each of the custom hardware components to be installed. The serial number, sometimes referred to as a service mark number, is generated by the computer manufacturer at the time the computer system is ordered by the customer and is included in the architecture resource file. In this manner, each architecture resource file is unique and is associated with a unique computer system and unique customer order.

In step 208, the computer manufacturer runs a hardware architecture verification program. The function of the hardware verification program is to evaluate the operability and compatibility of the custom hardware components of the computer system ordered by the customer. The hardware verification program will evaluate whether the custom hardware components ordered by the customer will operate with the processor and chip set architecture selected by the user. The hardware verification program will also evaluate whether the custom hardware components ordered by the customer will be compatible with one another. Finally, the hardware verification program will identify an installation location on the motherboard or computer system for each custom hardware component ordered by the customer.

The inputs to the hardware verification program are the identification numbers or codes for the hardware components identified in the architecture resource file. In operation, the hardware verification program is able to access a data set of rules and specifications for each hardware component that is identified in the architecture resource file. The data set of rules and specifications identifies the operational limitations of each component, including operational limitations that concern the hardware component's compatibility with the base architecture of the computer system and operational limitations that concern the hardware component's compatibility with other hardware components that have been selected by the customer for installation in the computer system. The hardware verification program will also access a data set of rules and specifications for the base architecture of the computer system. The data set of rules and specifications for the base architecture identifies limitations on the ability of the base architecture to function with certain hardware components.

With respect to the data set of rules and specifications for individual hardware components, the data set will identify any limitations on the installation location of each hardware component. For example, it may be the case that a certain hardware component, such as a network interface card or a server interface card, may only be installed in a given slot for certain models of motherboard or processor. As another example, for some cards, the data set will identify the number of pins on the card and the corresponding number of pins that must be present in the slot that is to receive the card to take advantage of the full functionality of the card. The data set of rules and specifications for individual hardware components will also identify any incompatibility limitations between hardware components. As an example, the data set may specify that a memory card may function improperly when installed in the same computer system as a certain network interface card. The data set of rules and specifications will also identify the firmware revision of the hardware components, the compatibility of the selected hardware component with basic input/output system (BIOS) revisions, and the interrupt type expected by the selected hardware component. The data set of rules and specifications will also identify hardware components that must be installed if certain other hardware is installed in the computer system. As an example, if the customer orders a SCSI device, the data set will specify the necessary SCSI hardware that must also be installed in the computer system.

In operation, the hardware verification program searches the architecture resource file for an identification of the base architecture of the computer system and a listing of the custom hardware components ordered by the customer. As described above, the hardware components that may be ordered by a customer for installation in a computer system include option cards, controller cards, modems, graphics cards, network interface cards, hard drive controllers, RAID controllers, server management cards, ISDN cards, serial port cards, parallel port cards, redundant power supplies, and memory modules, including single in-line memory modules (SIMMs) and dual in-line memory modules (DIMMs).

As a first step in the hardware verification program, the program determines whether the computer system ordered by the customer includes too many hardware components to be supported by the base architecture of the computer system. A second step in the hardware verification program is the determination of a location for the installation of certain selected hardware components. Using the data set of rules and specifications for each hardware component and the base architecture of the computer system, the hardware verification program identifies a suitable location for each hardware component in the available slots, ports, and locations of the motherboard and computer system. For each hardware component, the installation location determined by the hardware verification program will be one in which the hardware component may be installed and function properly with the base architecture and with the other components of the computer system.

The custom hardware components of the computer system are assigned installation locations by the hardware verification program in a serial manner. As part of the hardware verification of step 208, the hardware verification begins by attempting to assign an installation location to the hardware component having the most operational limitations. At step 210, it is determined whether the hardware verification program was able to identify a compatible installation location for the selected hardware component. If the selected component was assigned to a compatible installation location, the hardware verification program evaluates at step 212 whether all hardware components have been assigned an installation location. If any of the selected hardware components remain unassigned to an installation location, the hardware verification program continues to execute at step 208 to identify a location for the next of the unassigned hardware components.

If a hardware component is assigned to an incompatible location at step 208, it is determined at step 214 whether all possible configurations have been exhausted. If all possible hardware configurations have not been exhausted, processing will continue at step 208, where the unassigned hardware component will be assigned to another installation location. If all installation locations have been determined to be incompatible for a selected hardware component, the hardware verification program at step 208 will reassign installation locations for all hardware components, giving first priority to the hardware component not yet assigned. In this manner, the previously unassigned hardware component will be the first hardware component assigned an installation location. Following the identification of a compatible installation location for the hardware component, processing will continue with respect to the remainder of the hardware components.

If an incompatible hardware component is identified by the hardware verification test and once the hardware verification test has exhausted all possible installation configurations for the incompatible hardware component, the program will transmit an incompatibility message at step 216. The incompatibility message will identify the incompatible hardware component. The message may identify the reason for the incompatibility or provide options for resolving the incompatibility. As an example, the program may identify the cause of the incompatibility as the inability of selected hardware components to function together in the same computer system. The hardware verification program will terminate at step 218.

Figure 3:
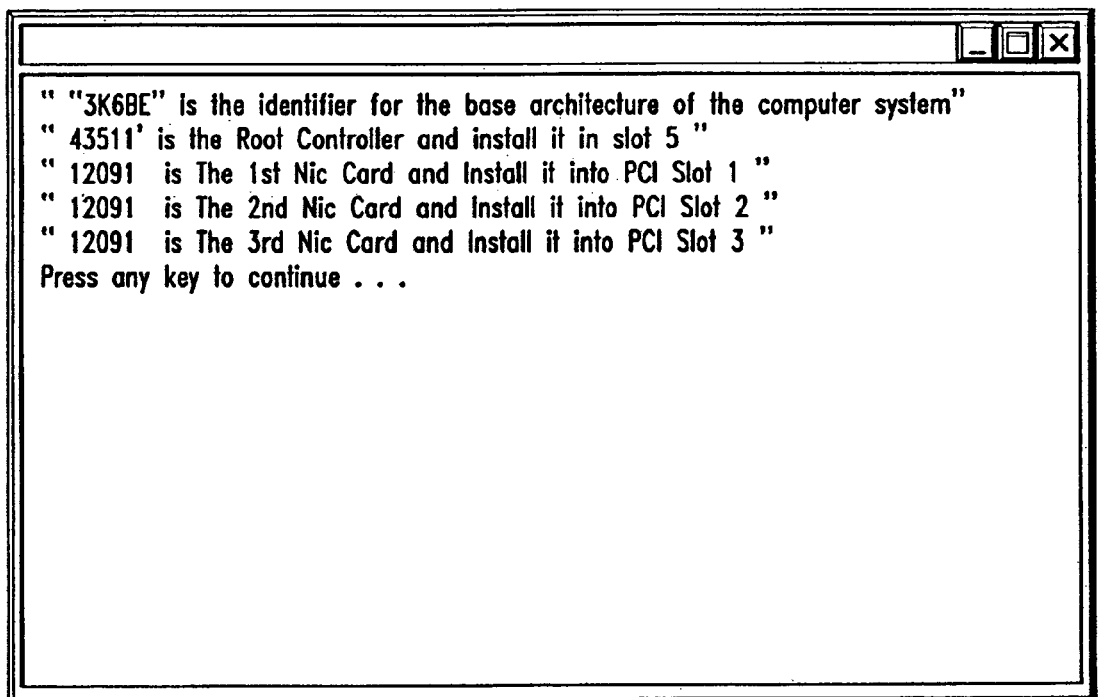
FIG. 3 is a representation of a display screen that includes instructions concerning the hardware components to be installed in the computer system.

Once all hardware components have been assigned a compatible installation location, the program will generate a set of written installation instructions at step 222. The written instructions will identify where selected hardware components are to be installed in the computer system. An example of the written instructions of step 222 are shown in FIG. 3. The screen display 302 of the written instructions includes an identification of the part number of each hardware component to be installed and the location, slot, or port for installation. The written instructions may also include warnings or cautionary statements about the operation or installation of certain hardware components.

Figure 4:
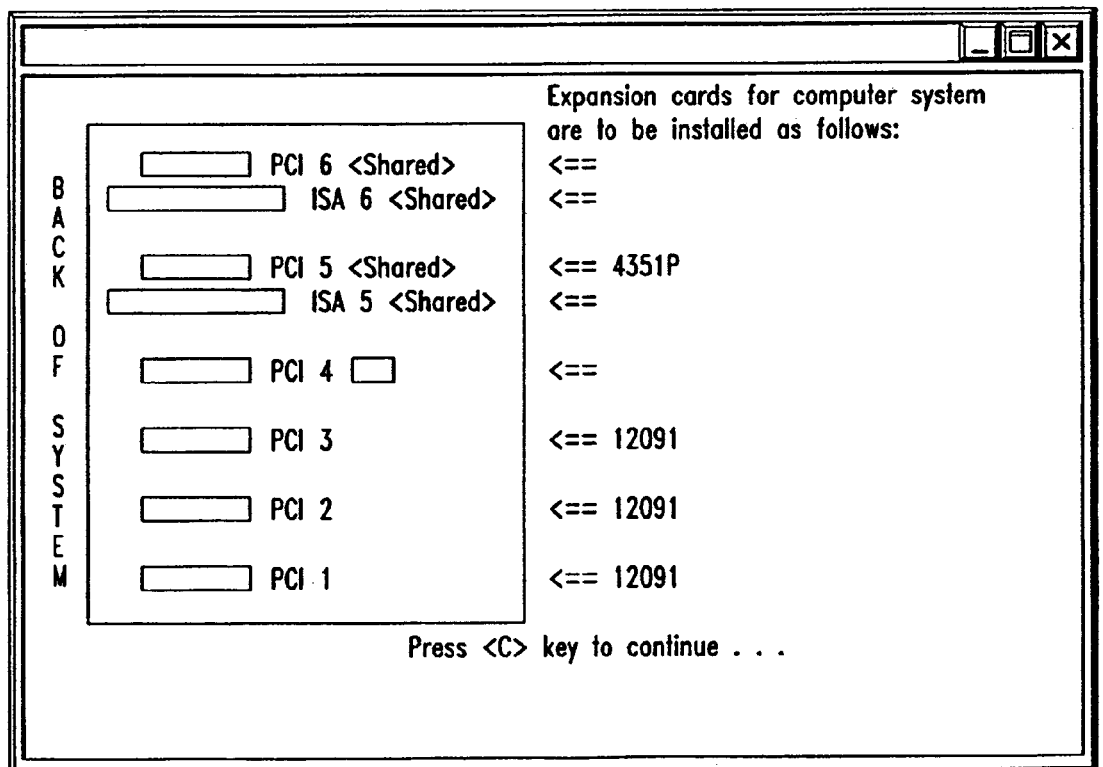
FIG. 4 is a representation of a graphical display that depicts a placement of hardware components in a computer system.

At step 224, the hardware verification program generates a graphical representation of the installation locations for the hardware components of the computer system. An example of the graphical representation of the installation locations is shown in the sample screen display 402 of FIG. 4. In the graphical representation, each hardware component is identified by its part number and its assigned installation location in the computer system. The installation locations are represented by rectangles or other symbols and roughly approximate the installation sites in the motherboard or computer system. The graphical representation also acts as a quality check during the manufacturing process. During manufacture, the graphical representation and the written instructions will be provided to the computer assembly personnel on the manufacturing floor. By referencing the written instructions or the graphical representation 402, the personnel on the manufacturing floor can evaluate whether there is a discrepancy between the customer order, the hardware components collected for installation, and the parts identified in the written instructions and graphical representation. The personnel on the manufacturing floor can also evaluate whether the installation sites on the motherboard and computer system match those shown on the graphical representation. The personnel on the manufacturing floor then assemble the hardware components according to the written instructions and the graphical representation of installation sites for hardware components.

Although the present invention has been described in detail, it should be understood that various changes, substitutions and alterations can be made thereto without departing from the spirit and scope of the invention as defined by the appended claims.

What is claimed is:

1. A method for installing hardware cards in an installation slot in a motherboard of a computer system, wherein the computer system includes a base architecture, comprising:
   compiling a list of the hardware cards;
   assigning an installation slot for each hardware card;
   evaluating each hardware card to determine if the hardware card is compatible with respect to the other hardware cards of the computer system;
   evaluating the compatibility of each hardware card with respect to the base architecture of the computer system;
   displaying in graphical form the assigned installation slots of the hardware cards following a successful evaluation of the compatibility of the hardware cards with respect to (a) the other hardware cards of the computer system and (b) the base architecture of the computer system; and
   installing the hardware cards according to the assigned installation slots.

2. The method of claim 1, wherein the step of evaluating the compatibility of each hardware card of the computer system with respect to the base architecture of the computer system further comprises the step of evaluating the compatibility of the installation slot with respect to a selected hardware card.

3. The method of claim 1, wherein the list of hardware cards includes custom hardware cards selected for installation by a customer of the computer system.

4. The method of claim 1, wherein the step of compiling a list of hardware cards comprises the step of generating an architecture resource file that includes an identification of the hardware cards and base architecture of the computer system.

5. The method of claim 1, further comprising the step of displaying instructions identifying incompatible hardware cards.

6. The method of claim 1, wherein the step of compiling a list of hardware cards comprises the step of receiving a customer order and generating a list of hardware cards from the customer order.

7. The method of claim 1, further comprising the step of assigning an identification number to the computer system.

8. The method of claim 7, wherein the identification number is a serial number.

9. The method of claim 7, wherein the identification number identifies assembled hardware cards.

* * * * *